United States Patent
Kobayashi et al.

(10) Patent No.: US 12,407,950 B2
(45) Date of Patent: Sep. 2, 2025

(54) IMAGING DEVICE HAVING PIXEL CIRCUIT THAT ALTERNATELY PERFORMS TRANSFER OF CHARGE AND CONTROL METHOD THEREOF

(71) Applicant: CANON KABUSHIKI KAISHA, Tokyo (JP)

(72) Inventors: Hirokazu Kobayashi, Tokyo (JP); Yuuichirou Hattori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 99 days.

(21) Appl. No.: 18/172,609

(22) Filed: Feb. 22, 2023

(65) Prior Publication Data
US 2023/0276143 A1     Aug. 31, 2023

(30) Foreign Application Priority Data
Feb. 25, 2022   (JP) ................ 2022-028330

(51) Int. Cl.
*H04N 25/59* (2023.01)
*H04N 25/75* (2023.01)
*H04N 25/771* (2023.01)

(52) U.S. Cl.
CPC ............. *H04N 25/59* (2023.01); *H04N 25/75* (2023.01); *H04N 25/771* (2023.01)

(58) Field of Classification Search
CPC ...... H04N 25/59; H04N 25/75; H04N 25/771; H04N 25/77; H04N 25/78; H04N 25/79; H04N 5/378
See application file for complete search history.

(56) References Cited

U.S. PATENT DOCUMENTS

| | | | |
|---|---|---|---|
| 2002/0190215 A1* | 12/2002 | Tashiro | H04N 25/41 348/E5.088 |
| 2015/0156387 A1 | 6/2015 | Miyakoshi | |
| 2018/0213169 A1* | 7/2018 | Onuki | H10F 39/802 |
| 2019/0098232 A1* | 3/2019 | Mori | H01L 27/1464 |

FOREIGN PATENT DOCUMENTS

JP  2015-109503 A   6/2015

* cited by examiner

*Primary Examiner* — Christopher K Peterson
(74) *Attorney, Agent, or Firm* — Canon U.S.A., Inc. IP Division

(57) ABSTRACT

A plurality of pixel circuits are arranged in a row direction and a column direction. Each of the pixel circuits includes a photoelectric conversion circuit for light from a subject. Signal charge of the photoelectric conversion circuit is transferred to a charge holding circuit and is discharged via an overflow gate (OFG). A signal processing substrate includes a plurality of signal holding circuits for the plurality of pixel circuits. The signal holding circuit includes a holding capacity circuit that holds a voltage signal or signal charge transferred from the charge holding circuit. Driving for converting signals of the holding capacity circuit into digital signals in a row-sequential manner and outputting the digital signals is performed in a period of intermittent charge accumulation in which transfer and discharge of charge from the photoelectric conversion circuit to the charge holding circuit are alternately performed.

12 Claims, 8 Drawing Sheets

IMAGING DEVICE HAVING PIXEL CIRCUIT THAT ALTERNATELY PERFORMS TRANSFER OF CHARGE AND CONTROL METHOD THEREOF

BACKGROUND

Technical Field

One disclosed aspect of the embodiments relates to an imaging device and a control method thereof.

Description of the Related Art

An imaging device that performs photoelectric conversion for each exposure time division obtained by dividing a necessary exposure time required for imaging a subject into a plurality of time periods has been proposed. A technique for adding pixel signals obtained by the divided exposure times is disclosed in Japanese Patent Application Laid-Open No. 2015-109503. An imaging element generates pixel signals by photoelectric conversion with a variable exposure time, and an accumulation unit or circuit accumulates the pixel signals. The imaging element repeatedly generates pixel signals by photoelectric conversion for each divided exposure time obtained by dividing a necessary exposure time into a plurality of times at predetermined time intervals within an imaging period of one frame image. The accumulation circuit accumulates the pixel signals generated by the imaging element and outputs the accumulated pixel signals during the period of the necessary exposure time. A conversion circuit AD-converts analog signals (pixel signals) output by the imaging element into digital signals.

In a case where AD conversion is performed using the technique disclosed in Japanese Patent Application Laid-Open No. 2015-109503, power consumption increases by the amount of AD conversion performed for each divided exposure time. In addition, when signals are read out from an analog signal accumulation circuit provided in the imaging element, it is necessary to read out signals of all pixels at high speed and perform AD conversion so that divided exposure of the next frame can be started early. A power consumption peak increases accordingly, thereby resulting in a possibility of increasing noise.

SUMMARY

An object of the embodiments is to provide an imaging device capable of dividing exposure that effectively utilizes an imaging period of one frame image while suppressing increases in power consumption and the peak thereof.

A device according to an embodiment is an imaging device including a pixel circuit, a signal circuit that is electrically connected to the pixel circuit, and a conversion circuit that converts an analog signal output by the signal circuit into a digital signal. The pixel circuit includes a photoelectric conversion circuit that performs photoelectric conversion on light from a subject, a charge discharge circuit that discharges signal charge of the photoelectric conversion circuit, a first holding circuit that holds a signal based on an output of the photoelectric conversion circuit, and a first transfer circuit that transfers a signal based on the output of the photoelectric conversion circuit to the first holding circuit. The signal circuit includes a second holding circuit that holds a signal based on an output of the pixel circuit, and a second transfer circuit that transfers a signal based on the output of the pixel circuit to the second holding circuit. The pixel circuit alternately performs transfer of charge from the photoelectric conversion circuit to the first holding circuit by the first transfer circuit and discharge of charge from the charge discharge circuit during a period of a first frame. The signal circuit is configured such that the second transfer circuit performs transfer from the pixel circuit to the second holding circuit and outputs a signal to the conversion circuit during a period of a second frame following the first frame.

Further features of the disclosure will become apparent from the following description of exemplary embodiments with reference to the attached drawings.

DESCRIPTION OF THE EMBODIMENTS

A preferred embodiment of the disclosure will now be described in detail with reference to the accompanying drawings. In an imaging device of the embodiment, driving for intermittent charge accumulation in which transfer and discharge of charge to a charge holding circuit are alternately performed a plurality of times and driving for converting pixel signals, which are analog signals, into digital signals and outputting them are performed in an imaging period of images of one frame. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Figure 1:
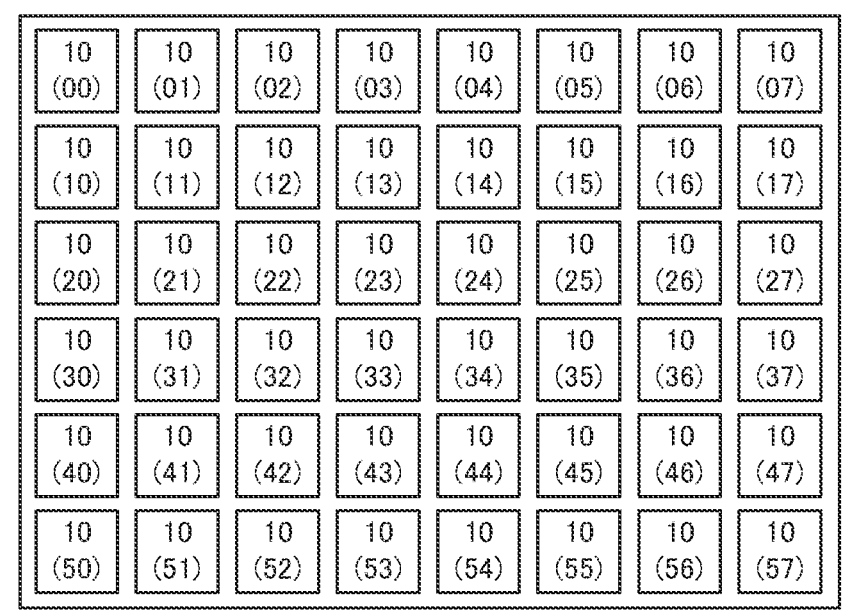
FIG. 1 is a diagram illustrating a configuration of a light receiving surface side of an imaging device according to an embodiment.

FIG. 1 is a diagram illustrating a configuration of a light receiving surface side of a PD substrate (first semiconductor substrate) on which a plurality of photodiodes (hereinafter referred to as PDs) constituting a photoelectric conversion unit of the imaging device according to the embodiment are disposed. Among the plurality of PDs, a PD $10(pq)$ represents a PD positioned at a p-th row and a q-th column with respect to the position of a PD at an upper left corner when viewed from the light receiving surface side. FIG. 1 illustrates an example of a pixel array of six rows by eight columns, but in reality, a large number of tens of millions of pixels are arranged in a two-dimensional array.

Figure 2:
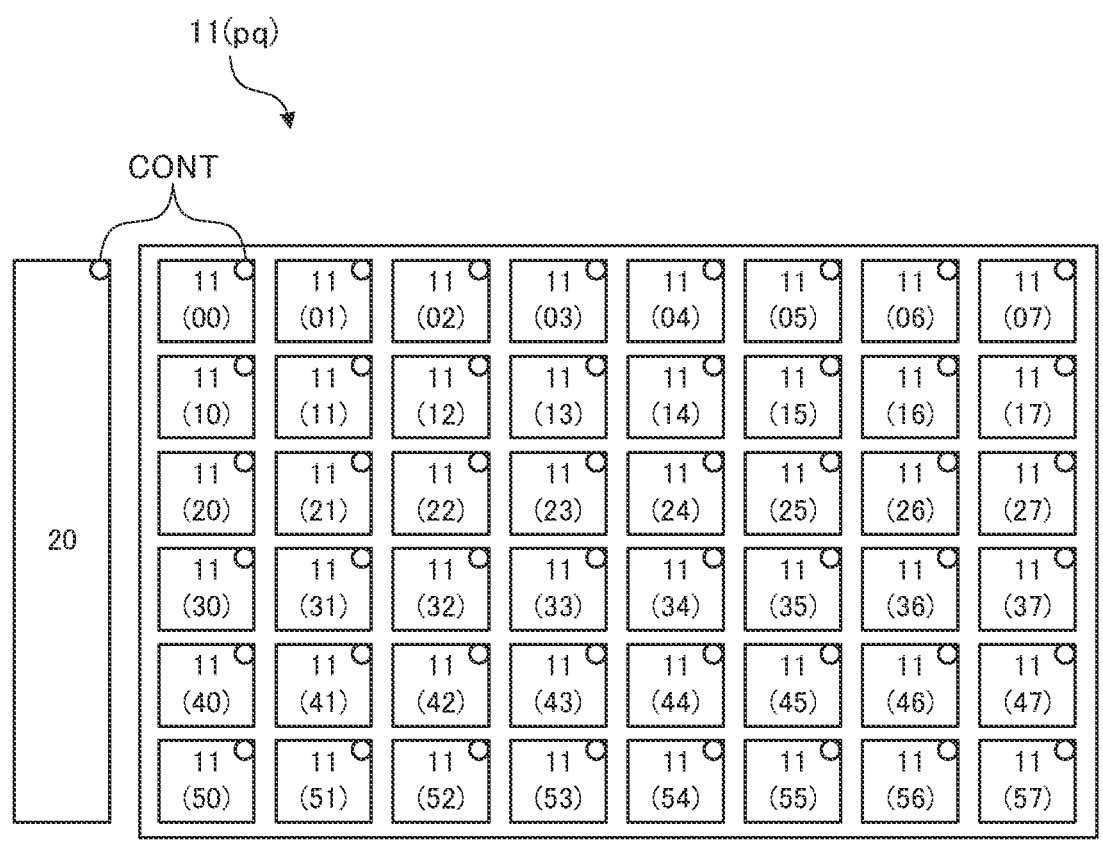
FIG. 2 is a diagram illustrating a configuration of a surface on a side opposite to the light receiving surface side of the imaging device according to the embodiment.

FIG. 2 is a diagram illustrating a configuration of a surface (non-light receiving surface) on a side opposite to the light receiving surface of the PD substrate of the imaging device according to the embodiment. FIG. 2 illustrates a state where the non-light receiving surface is seen through from the light receiving surface side, and pixel circuits $11(pq)$ are arranged in a two-dimensional array corresponding to the photodiodes PD $10(pq)$ in FIG. 1. In FIG. 2, among the plurality of pixel circuits, a pixel circuit $11(pq)$ represents a pixel circuit positioned at a p-th row and a q-th column with respect to the position of a pixel circuit at an upper left corner in FIG. 2. Hereinafter, the PD $10(pq)$ on the light receiving surface and the pixel circuit $11(pq)$ present at the position corresponding to the PD on the non-light receiving surface are collectively referred to as a pixel unit.

A voltage signal which is an output of the pixel circuit $11(pq)$ can be transferred to a signal processing substrate to be described later via an electrical contact CONT for each pixel circuit. The electrical contact CONT is bonded to a vertical scanning circuit 20 (FIG. 3) of the signal processing substrate, and a global shutter operation and intermittent charge accumulation can be realized by issuing control signals to the PD and the like on the PD substrate. A driving timing will be described in detail after an equivalent circuit diagram including a pixel circuit is described.

For example, an N-type silicon substrate is used as the PD substrate. The PD is formed as an N-type semiconductor region in order to accumulate electrons among electron-hole pairs generated when light is received from the outside.

Figure 3:
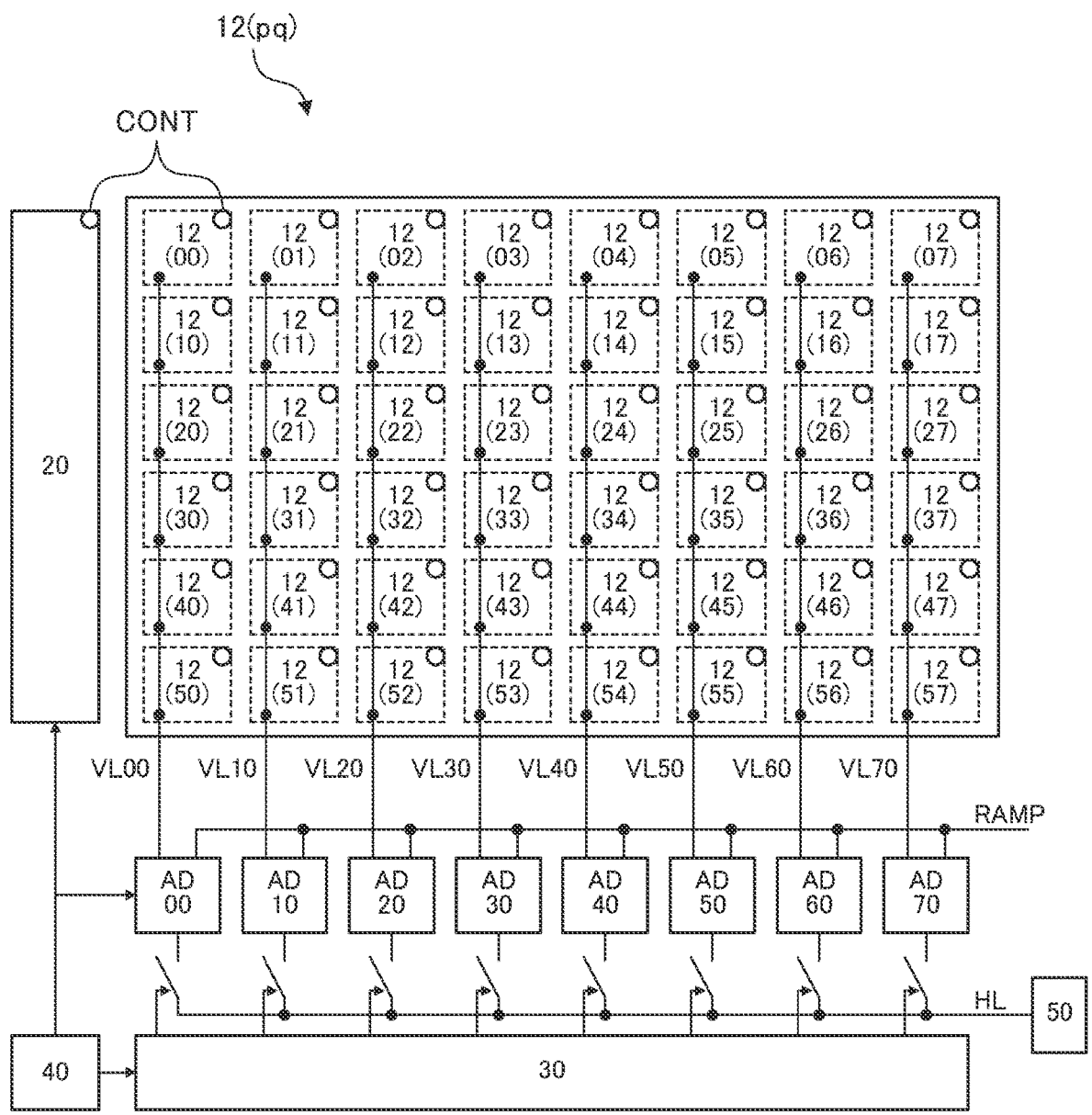
FIG. 3 is a block diagram illustrating a configuration of a signal processing substrate of the imaging device according to the embodiment.

FIG. 3 is a block diagram illustrating a configuration of a signal processing substrate (second semiconductor substrate) of the imaging device according to the embodiment. The signal processing substrate includes a plurality of signal circuits that are electrically connected to a plurality of pixel circuits included in a PD substrate. That is, signal holding circuits $12(pq)$ are arranged in a two-dimensional array corresponding to the pixel circuits $11(pq)$ on the PD substrate. Among the plurality of signal holding circuits, the signal holding circuit $12(pq)$ represents a signal holding circuit positioned at a p-th row and a q-th column with respect to the position of a signal holding circuit at an upper left corner in FIG. 3.

The PD substrate and the signal processing substrate are configured to be laminated on each other, and the signal holding circuit $12(pq)$ and the pixel circuit $11(pq)$ are connected to each other at the electrical contact CONT. In addition, voltage signals output by the pixel circuit $11(pq)$ can be accumulated collectively in all pixels in the corresponding signal holding circuit $12(pq)$. Thereby, it is possible to realize a global shutter function.

The vertical scanning circuit 20 is a circuit that scans the pixel circuits 11 and the signal holding circuits 12. A plurality of vertical output lines VLq0 and a plurality of AD conversion circuits ADq0 are provided corresponding to the plurality of signal holding circuits $12(pq)$. For example, when q=0, the signal holding circuits $12(00)$ to $12(50)$ are connected to the AD conversion circuit AD00 via the vertical output line VL00. Voltage signals read out from the pixel circuit 11 by the vertical scanning circuit 20 and accumulated in the signal holding circuit 12 are transmitted to the AD conversion circuit ADq0 via the vertical output line VLq0 in a row-sequential manner.

Digital signals converted from analog signals by the AD conversion circuit ADq0 are transferred to the output unit or circuit 50 via the horizontal output line HL by the horizontal scanning circuit 30 in a column-sequential manner. The output unit 50 includes a known parallel/serial (P/S) conversion circuit and sequentially converts digital imaging signals transferred to the horizontal output line HL into signals in a high-speed serial transmission format such as LVDS and outputs them. LVDS is an abbreviation for "Low Voltage Differential Signaling". In addition, the output unit 50 may include a correction processing circuit that performs point defect correction and the like.

In the imaging device according to the present embodiment, one vertical output line VLq0 exists for each column and is shared by all rows of the same column. In addition, one AD conversion circuit ADq0 exists for each column. A signal of the vertical output line VLq0 and a ramp-shaped reference signal RAMP that fluctuates with the elapse of time are input to the AD conversion circuit ADq0. Note that the configuration of the AD conversion circuit ADq0 is known, and thus the detailed description thereof will be omitted. A structure for accumulating voltage signals of the signal holding circuit $12(pq)$ will be described later using an equivalent circuit diagram together with the PD $10(pq)$ and the pixel circuit $11(pq)$.

A timing generation circuit 40 outputs a predetermined timing signal to the vertical scanning circuit 20, the AD conversion circuit ADq0, the horizontal scanning circuit 30, and the like. A predetermined driving timing, the control of the AD conversion circuit ADq0, and a horizontal scanning timing, which are supplied to the pixel circuit $11(pq)$ and the signal holding circuit $12(pq)$ by the vertical scanning circuit 20 in a row-sequential manner, are determined based on a timing signal generated by a timing generation circuit 40. A driving method for the imaging device will be described later using a timing chart.

First Example

Figure 4:
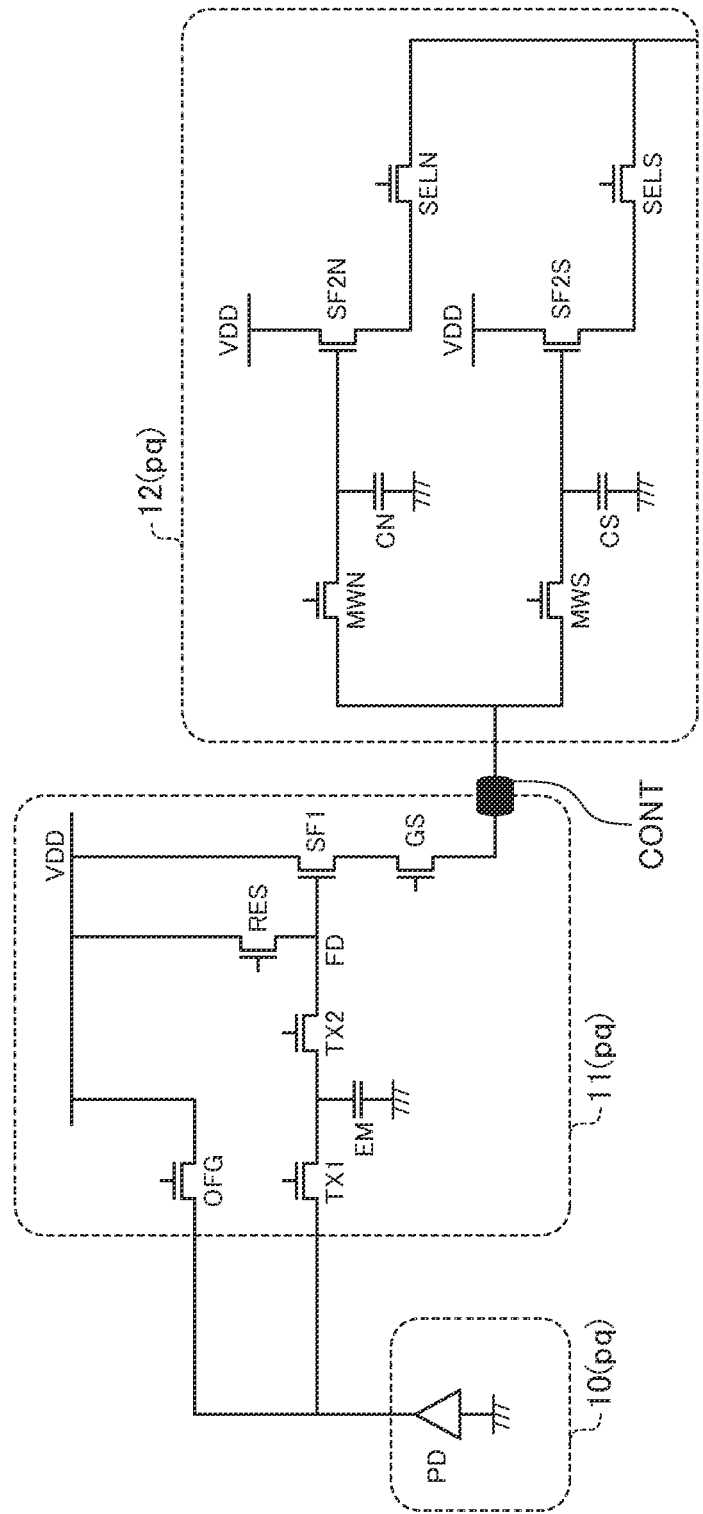
FIG. 4 is an equivalent circuit diagram illustrating configurations of a pixel circuit and a signal holding circuit of a first example.

Next, an imaging device according to a first example will be described with reference to FIGS. 4 and 5. FIG. 4 illustrates an example of equivalent circuit diagrams of the PD $10(pq)$, the pixel circuit $11(pq)$, and the signal holding circuit $12(pq)$ in the present example.

The PD $10(pq)$ is a photoelectric conversion element configured such that an anode is grounded and a cathode is connected to the pixel circuit $11(pq)$.

A first transfer transistor TX1 constitutes a transfer unit or circuit of signal charge. A source of the first transfer transistor TX1 is connected to a cathode of a PD $10(p,q)$, and charge generated by the PD$(pq)$ is transferred to a charge holding unit or circuit EM. The charge holding circuit EM has a charge holding capacity for signal charge of the photoelectric conversion circuit.

A second transfer transistor TX2 is connected to the charge holding circuit EM. Charge of the charge holding circuit EM is transferred to a floating diffusion unit or circuit (hereinafter referred to as a FD circuit) that constitutes a charge-voltage conversion unit or circuit by the second transfer transistor TX2. A first amplification transistor SF1 and a reset transistor RES are connected to the FD circuit.

The first amplification transistor SF1 has a gate connected to the FD circuit and constitutes a source follower circuit with a current source which is not illustrated in the drawing. In addition, the reset transistor RES is a transistor that can reset the FD circuit with a power supply of a predetermined voltage VDD. A batch transfer transistor GS is connected to a drain of the first amplification transistor SF1, and a source of the batch transfer transistor GS is connected to the electrical contact CONT.

An overflow gate (referred to as OFG) constitutes a charge discharge unit or circuit. A transistor of the OFG is provided in parallel with the first transfer transistor TX1, and discharges charge generated by the PD $10(pq)$ to a power supply of a predetermined voltage VDD.

Transistors RES, TX1, TX2, GS and OFG can be controlled by control signals supplied to respective gates from the vertical scanning circuit 20. Based on the control signals from the vertical scanning circuit 20, transfer and discharge of charge of the PD $10(pq)$, and read-out of voltage signals corresponding to charge accumulated in the charge holding circuit EM are collectively controlled in all pixels.

The signal holding circuit $12(pq)$ is connected to the source of the batch transfer transistor GS via the electrical contact CONT. The signal holding circuit $12(pq)$ includes transistors MWN and MWS for memory writing, and two voltage holding capacity units or circuits CN and CS that accumulate voltage signals output from the pixel circuit $11(pq)$. The voltage holding capacity circuits CN and CS have a voltage holding capacity for signals based on the output of the pixel circuit.

The transistors MWN and MWS are connected in parallel to electrical contact CONT. The transistor MWN and the voltage holding capacity circuit CN are connected to each other, and the transistor MWS and the voltage holding capacity circuit CS are connected to each other. The transistors MWN and MWS perform an operation of writing voltage signals to the corresponding voltage holding capacity circuits CN and CS.

The voltage holding capacity circuit CN holds a voltage after the reset of the FD circuit of the pixel circuit $11(pq)$ is released. Hereinafter, a signal of a voltage held in the voltage holding capacity circuit CN will be referred to as an N signal. In addition, the voltage holding capacity circuit CS holds a voltage of the FD circuit which has dropped in response to signal charge of the PD. Hereinafter, a signal of a voltage held in the voltage holding capacity circuit CS will be referred to as an S signal.

For the voltage holding capacity circuits CN and CS, a capacitive element with a surface area enlarged by using a trench structure or the like, or a high capacitive element formed between wirings at a location using a high dielectric constant material between wiring layers of the signal processing substrate can be used. Further, a transistor gate oxide film of the signal processing substrate may be partially used for the voltage holding capacity circuits CN and CS. Thermal noise can be reduced by further increasing a voltage holding capacity, which contributes an improvement in image quality.

Second amplification transistors SF2N and SF2S are connected to the voltage holding capacity circuits CN and CS, respectively. That is, a gate of the second amplification transistor SF2N is connected to the voltage holding capacity circuit CN. A gate of the second amplification transistor SF2S is connected to the voltage holding capacity circuit CS. Drains of the second amplification transistors SF2N and SF2S are connected to a power supply of a predetermined voltage VDD, and constitute a source follower circuit using a current source which is not illustrated in the drawing.

Selection transistors SELN and SELS are connected to the second amplification transistors SF2N and SF2S, respectively. That is, the signal holding circuit $12(pq)$ includes selection transistors SELN and SELS so as to be able to selectively transmit source voltages of the second amplification transistors SF2N and SF2S to the vertical output line VLq0. A driving method and a sequence until the selection transistors SELN and SELS output an N signal and an S signal will be described below using a timing chart, and these selection transistors are also used for scanning in a row direction.

Next, a method of driving the imaging device according to the present example will be described. FIG. 5 is a timing chart illustrating the method of driving the imaging device according to the present example. In FIG. 5, control signals PRES, POFG, PTX1, PTX2, PGS, PMWN, PMWS, PSELN and PSELS are supplied to the gates of transistors RES, OFG, TX1, TX2, GS, MWN, MWS, SELN and SELS, respectively. With respect to the polarity of each control signal, it is assumed that the transistor is turned on when the signal is set to be in a Hi state, and the transistor is turned off when the signal is set to be in a Lo state. A direction of the elapse of time is assumed to be a direction from the left to the right in FIG. 5.

Figure 5:
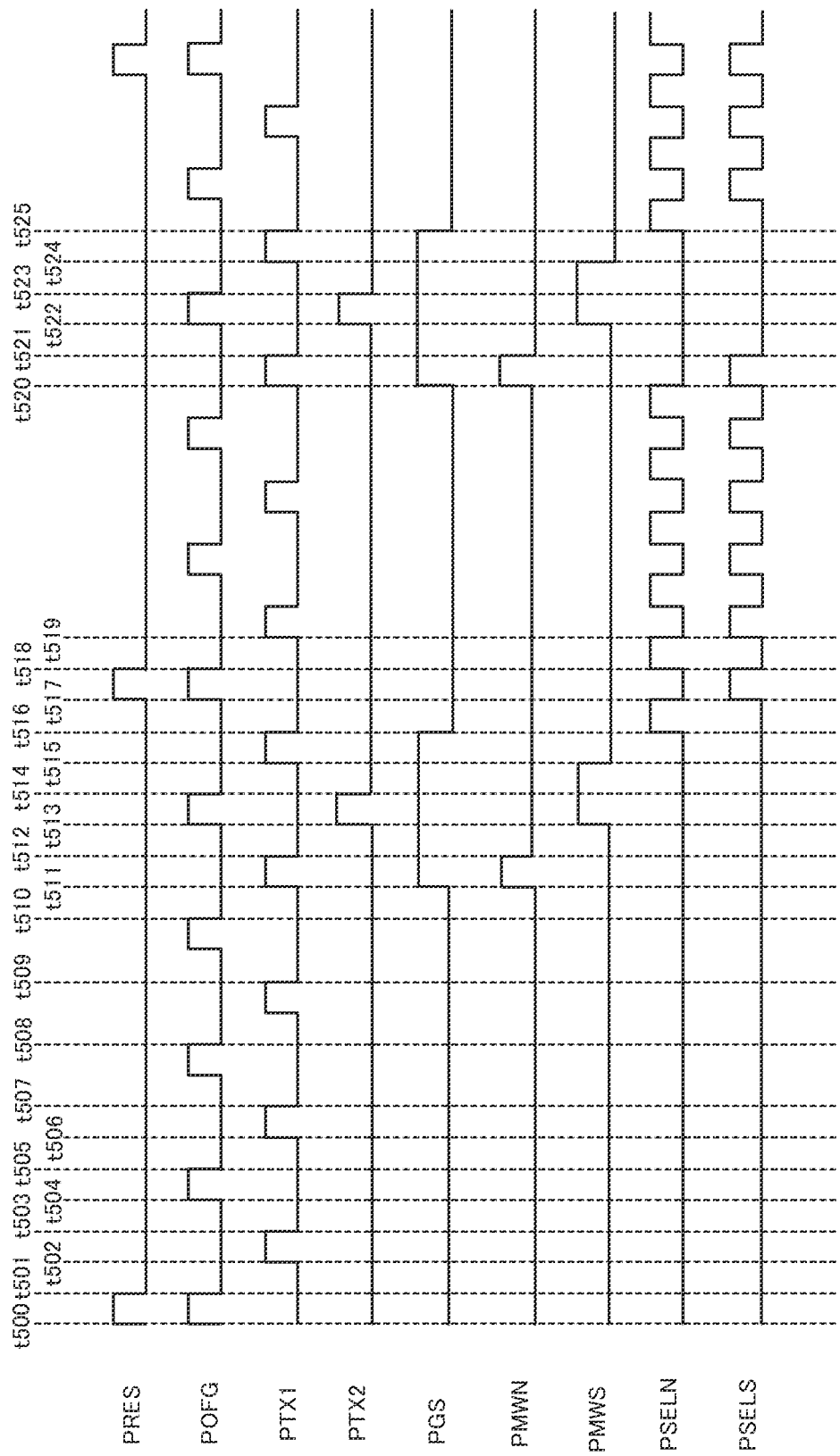
FIG. 5 is a timing chart illustrating a driving method for the imaging device according to the first example.

The length of a first period from time t500 to time t512 illustrated in FIG. 5 is equivalent to an imaging time of an image of a first frame. As will be described later, intermittent charge accumulation in which charge transfer and charge discharge are alternately repeated a plurality of times within the first period.

Further, in a second period from time t513 to time t516 illustrated in FIG. 5, a global shutter operation of transferring a voltage signal corresponding to signal charge of each pixel of the first frame to the corresponding signal holding circuit of the signal processing substrate at the same time for all pixels is performed.

Furthermore, a third period from time t516 to time t521 is a sequential read-out scanning period of a signal holding circuit $12(0q)$ positioned in a 0-th row of the signal processing substrate to the signal holding circuit $12(5q)$ positioned at a fifth row.

First, a driving method in the first period will be described. During a period from time t500 to time t501, the control signal PRES is Hi, and an operation of resetting the FD circuit with a power supply of a predetermined voltage VDD is performed. In addition, the control signal POFG is set to be in a Hi state during the period, and an operation of resetting the PD with a power supply of a predetermined voltage VDD is performed. Note that the control signal PRES is set to be in a Lo state during a period from time t501 to time t517.

Next, the control signal PTX1 is set to be in a Hi state during a period from time t502 to time t503. Signal charge generated by the PD during a period from time t501 to time t503 is transferred to the charge holding circuit EM. Subsequently, the control signal POFG is set to be in a Hi state during a period from t504 to time t505, and an operation of discharging signal charge generated by the PD during a period from time t503 to time t505 is performed.

During a period from time t506 to time t507, the control signal PTX1 is set to be in a Hi state again, and an operation of transferring signal charge generated by the PD to the charge holding circuit EM during a period from time t505 to time t507 is performed. Since charge generated during the period from time t501 to time t503 has been already accumulated in the charge holding circuit EM, the generated charge and new signal charge are added up.

That is, the charge holding circuit EM accumulates charge generated during the period from time t501 to time t503 and during the period from time t505 to time t507. In this case, charge generated during the period from time t503 to time t505 is not included. In this manner, discharge of signal charge and transfer of signal charge to the charge holding circuit are intermittently performed, and thus it is possible to smoothly image a moving object, which is a subject in a moving image, without increasing a shutter speed even in a bright environment.

The intermittent charge accumulation described above is repeated until time t512. That is, transfer of charge to the charge holding circuit EM is performed four times in total, including a period from time t508 to time t509 and a period from time t510 to time t512. However, the number of times of charge transfer can be set arbitrarily, and can be determined appropriately in accordance with to the speed of movement of the subject (moving body).

In addition, a ratio of the length of time between a charge transfer period and charge discharge period can be arbitrarily set and can be determined in accordance with the brightness of a subject field. In particular, a necessary exposure time determined by automatic exposure control (Auto Exposure) or the like is controlled as a total net accumulation time for accumulating signal charge of the PD in the charge holding circuit. Specifically, a total time of lengths of the period from time t501 to time t503, the period from time t505 to time t507, the period from time t508 to time t509, and the period from time t510 to time t512 is a necessary exposure time.

In the last charge transfer period of the four times, the control signal PGS and the control signal PWMN are set to be in a Hi state in parallel at time t511, and the control signal PWMN is set to Lo at time t512. Thereby, an N signal, which is the voltage signal after the reset of the FD circuit is released, is written to the voltage holding capacity circuit CN of the signal holding circuit 12(pq).

Next, a driving method in the second and third periods will be described. During a period from time t513 to time t514, the control signal PTX2 is set to be in a Hi state, and an operation of transferring signal charge accumulated in the charge holding circuit EM to the FD circuit is performed. While the control signal PGS is set to be in a Hi state, control for setting the control signal PWMS to be in a Hi state at time t513 and to be in a Lo state at time t515 is performed. Thereby, an S signal being a voltage signal of the FD circuit which has lowered in response to the signal charge is written to the voltage holding capacity circuit CS. During a period from time t513 to time t514, the control signal POFG is set to be in a Hi state, and a charge discharge operation for intermittent charge accumulation for the next frame is performed.

During a period from time t514 to time t521, intermittent charge accumulation of a second frame including four charge transfers and discharges is performed in the same manner as the first frame. An operation of reading out a signal of the first frame is performed in parallel with the intermittent charge accumulation of the second frame. That is, the vertical scanning circuit 20 sets the control signal PSEKN of the 0-th row to be in a Hi state during a period from time t516 to time t517 and sets the control signal PSELS of the 0-th row to be in a Hi state during a period from time t517 to time t518. Thus, the N signal and the S signal of the 0-th row are transferred to an AD conversion unit or circuit via the vertical output line VL. The AD conversion circuit performs AD conversion for signals of intermittent charge accumulation for eight pixels of the 0-th row.

Further, at time t518, the vertical scanning circuit 20 performs a transition to scanning of the first row, and the control signal PSELN of the first row is set to be in a Hi state during a period from time t518 to time t519. At time t519, the control signal PSELS of the first row is set to be in a Hi state. Hereinafter, the same operation is repeated, and read-out scanning of all pixels is completed including a period from time t520 to time t521 when the control signal PSELS of the fifth row is set to be in a Hi state.

An operation in a fourth period from time t522 to time t525 is similar to the operation in the second period from time t513 to time t516 in the first frame. A global shutter operation of transferring a voltage signal corresponding to signal charge of each pixel in the second frame to the corresponding signal holding circuit corresponding of the signal processing substrate at the same time for all pixels is performed.

As described above, in the present example, signal readout scanning of an image of the first frame can be executed in parallel with an imaging period of an image of the second frame in which intermittent charge accumulation is performed, and thus it is possible to realize divided exposure that makes the utmost use of an imaging period of one frame image. Thus, smoothness (smooth continuity in time series) of images of a subject which is a moving object can be improved between a plurality of successive frames.

Further, in the present example, intermittent charge accumulation is performed only by a charge holding capacity unit or circuit, and AD conversion may be performed for each frame by utilizing most of an imaging period of the next frame. For this reason, it is possible to effectively utilize an imaging period of an image of one frame to suppress power consumption and an increase in the peak thereof. Furthermore, it is possible to suppress the driving frequency of the imaging device, which is effective for noise reduction measures.

In the present example, a configuration in which the signal holding circuit 12(pq) is provided on a signal processing substrate different from the PD substrate has been described. This configuration is advantageous in that stray light hardly enters the voltage holding capacity circuits CN and CS. Even when stray light enters the voltage holding capacity circuits CN and CS, a measure to further reduce a voltage lowered due to charge generated due to the stray light, that is, to reduce influence on a signal is adopted. The capacitance of the voltage holding capacity circuits CN and CS is set to be as large as possible than the capacitance of the FD circuit of the PD substrate. Furthermore, from the viewpoint of securing an occupied area, it is advantageous that the signal holding circuit 12(pq) is provided on a signal processing substrate different from the PD substrate.

Modification Example

In the imaging device, the signal holding circuit 12(pq) does not necessarily have to be provided on a semiconductor substrate different from the PD substrate. A modification example adopts a configuration in which the signal holding circuit 12(*pq*) is included in the PD substrate in proximity to the pixel circuit 11(*pq*). It is possible to reduce the number of substrates by excluding a signal processing circuit. This is the same for examples to be described later.

Second Example

A second example will be described with reference to FIGS. 6 and 7. In the present example, the same matters as those in the first example will not be described in detail by using the reference numerals, signs, and the like that have already been used, and differences therebetween will be mainly described. Such a method of abbreviating the description is the same for the examples to be described later.

Figure 6:
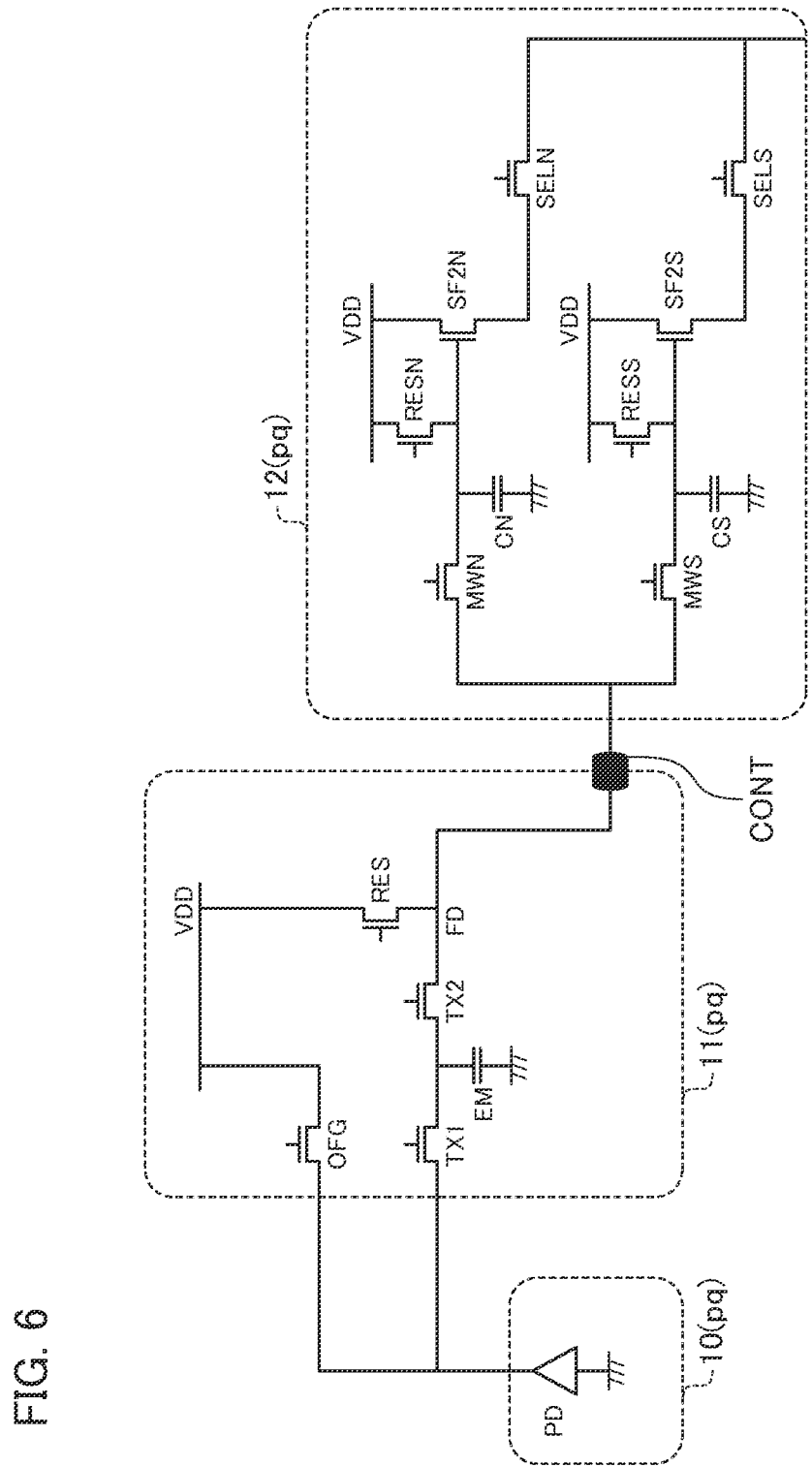
FIG. 6 is an equivalent circuit diagram illustrating configurations of a pixel circuit and a signal holding circuit of a second example.

FIG. 6 illustrates an example of equivalent circuit diagrams of the PD 10(*p,q*), the pixel circuit 11(*pq*), and the signal holding circuit 12(*pq*) of the imaging device according to the present example. Differences from the configuration illustrated in FIG. 4 are as follows.

In the pixel circuit 11(*pq*), the transistors SF1 and GS are not provided.

In the signal holding circuit 12(*pq*), a reset transistor RESN for resetting the holding capacity circuit CN and a reset transistor RESS for resetting the holding capacity circuit CS are provided.

Although CN and CS in the first example have a voltage holding capacity, CN and CS in the present example have a charge holding capacity for a signal based on an output of a pixel unit or circuit.

In the pixel circuit 11(*pq*) illustrated in FIG. 6, the FD circuit and a source of the reset transistor RES are connected to the electrical contact CONT. Further, in the signal holding circuit 12(*pq*), the reset transistor RESN has a source connected to the holding capacity circuit CN and a gate of the amplification transistor SF2N and has a drain connected to a power supply of a predetermined voltage VDD. The reset transistor RESS has a source connected to the holding capacity circuit CS and a gate of the amplification transistor SF2S and has a drain connected to the power supply of the predetermined voltage VDD.

A method of driving the imaging device according to the present example will be described with reference to the timing chart illustrated in FIG. 7. In FIG. 7, control signals PRESN and PRESS are supplied to the gates of the reset transistors RESN and RESS, respectively. The definition of Hi and Lo regarding the polarity of each control signal is the same as in the first example. In addition, a direction of the elapse of time is the same as in FIG. 5 and represents a period from time t700 to time t725.

A difference between the present example and the first example is that the pixel circuit 11(*pq*) does not perform charge-voltage conversion, and a source follower circuit is not provided. For this reason, an operation of resetting charge of the holding capacity circuits CN and CS via the transistors RESN and RESS of the signal holding circuit 12(*pq*) is performed. This reset operation period is a period from time t709 to time t710. During this period, the control signals PRESN and PRESS are set to be in a Hi state, and the transistors RESN and RESS are set to be in an ON state. In the present example, a period during intermittent charge accumulation is used as the reset operation period.

Figure 7:
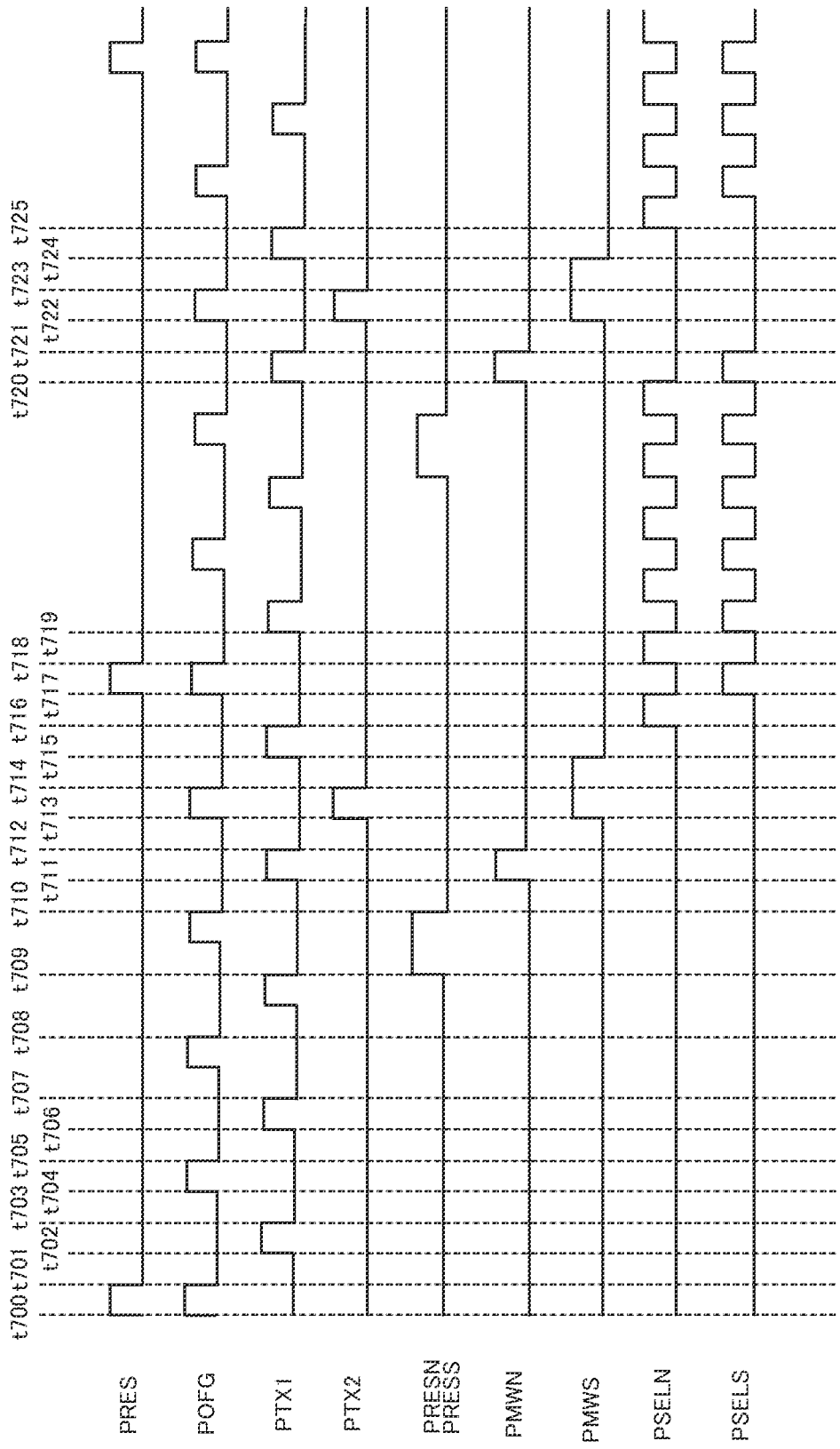
FIG. 7 is a timing chart illustrating a driving method for the imaging device according to the second example.

Further, in FIG. 7, there is no PGS because no batch transfer transistor GS is provided. The present example is the same as the first example illustrated in FIG. 5 in the other respects, and thus detailed description thereof will be omitted.

In the present example, the same effects as in the first example are obtained, and furthermore, a source follower circuit is not used in the transfer of charge to the signal holding circuit 12(*pq*), and thus it is possible to more suppress power consumption and an increase in the peak thereof than in the first example. Note that, also in the present example, the signal holding circuit 12(*pq*) may be included in the PD substrate in proximity to the pixel circuit 11(*pq*). However, in a case where the area of the PD 10(*pq*) in the photoelectric conversion circuit is reduced by the amount of the signal holding circuit 12(*pq*), a sensitivity, a saturation charge amount, and the like are reduced, thereby resulting in a possibility of deteriorating image quality, and thus it is preferable to provide the signal holding circuit 12(*pq*) on the signal processing substrate.

Third Example

An imaging device according to a third embodiment will be described with reference to FIG. 8. In the above-described example, an example in which a photoelectric conversion circuit includes a single PD 10(*pq*) has been described. In the present example, an example of a photoelectric conversion circuit including a plurality of PDs is described. For example, in the imaging device, a phase difference detection type pixel circuit includes a PDA and a PDB. The phase difference detection type pixel circuit is a pixel circuit that can receive light from a subject by dividing a pupil of an imaging optical system, which is not illustrated in the drawing, and serves as both a focus detection pixel and an imaging pixel.

Figure 8:
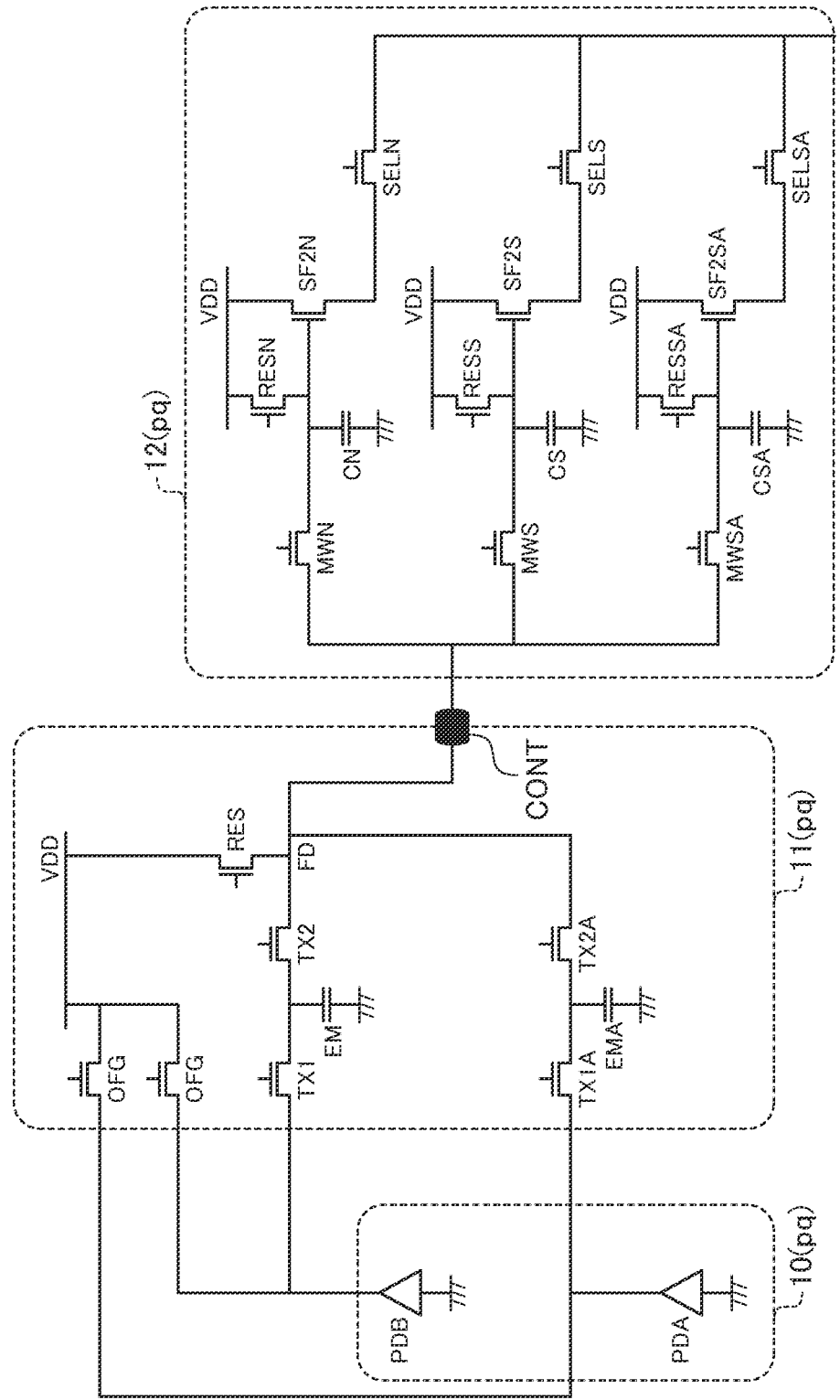
FIG. 8 is an equivalent circuit diagram illustrating configurations of a pixel circuit and a signal holding circuit of a third example.

FIG. 8 illustrates an example of an equivalent circuit diagram of a PD 10(*p, q*), a pixel circuit 11(*pq*), and a signal holding circuit 12(*pq*) of the imaging device according to the present example. Differences from the imaging device according to the second example illustrated in FIG. 6 are as follows.

In the PD 10(*pq*), two photodiodes, that is, the PDA and the PDB, are provided and disposed under a common microlens which is not illustrated in the drawing.

In the pixel circuit 11(*pq*), a charge holding circuit EMA and transfer transistors TX1A and TX2A are provided for the PDA, and a charge holding circuit EM and transfer transistors TX1 and TX2 are provided for the PDB.

In the signal holding circuit 12(*pq*), a transfer transistor MWSA, a holding capacity circuit CSA, an amplification transistor SF2SA, a reset transistor RESSA, and a selection transistor SELSA are provided.

Two OFGs that constitute a charge discharge circuit are connected to the PDA and the PDB, respectively.

In FIG. 8, the PDA has a cathode connected to the OFG and the first transfer transistor TX1A, and is connected to the charge holding circuit EMA via the first transfer transistor TX1A. The first transfer transistor TX1A constituting a transfer circuit transfers signal charge of the PDA to the charge holding circuit EMA. The charge holding circuit EMA is connected to the FD circuit via the second transfer transistor TX2A. The second transfer transistor TX2A transfers signal charge from the charge holding circuit EMA to the FD circuit.

In FIG. 8, the PDB has a cathode connected to the OFG and the first transfer transistor TX1, and is connected to the charge holding circuit EM via the first transfer transistor TX1. The first transfer transistor TX1 constituting the transfer circuit transfers signal charge of the PDB to the charge holding circuit EM. The charge holding circuit EM is connected to the FD circuit via the second transfer transistor TX2. The second transfer transistor TX2 transfers signal charge from the charge holding circuit EM to the FD circuit.

In the signal holding circuit 12(*pq*) of FIG. 8, a holding capacity unit or circuit CSA capable of accumulating signals corresponding to the signal charge of the PDA is added. The transfer transistor MWSA connected to an electrical contact CONT and the holding capacity circuit CSA transfers the signal charge to the holding capacity circuit CSA. The second amplification transistor SF2SA has a gate connected to the holding capacity circuit CSA and constitutes a source follower circuit using a current source which is not illustrated in the drawing. The selection transistor SELSA is connected to the second amplification transistor SF2SA so that a source voltage can be selectively transmitted to a vertical output line VLq0. The reset transistor RESSA performs an operation of resetting charge of the holding capacity circuit CSA.

A method of driving the imaging device according to the present example will be described with reference to FIG. 5. First, imaging signal acquisition processing will be described. A gate of the first transfer transistor TX1A is driven at the same timing as PTX1 illustrated in FIG. 5, and a gate of the second transfer transistor TX2A is driven at the same timing as PTX2. A gate of the transfer transistor MWSA is driven at the same timing as the control signal PWMS illustrated in FIG. 5, and a gate of the selection transistor SELSA is driven at the same timing as the signal PSELS. By this driving method, an added signal of the PDA and the PDB disposed under a common microlens can be acquired as an imaging signal.

Next, processing for acquiring a phase difference detection type focus detection signal will be described. Signals of the PDA and PDB are separately read out in accordance with the timing chart illustrated in FIG. 5. Alternatively, in an image processing unit or circuit which is not illustrated in the drawing, processing for reading out the signal of the PDA or the PDB and then subtracting the signal from the imaging signal to acquire the signal of the PDB or the PDA is performed.

For example, an image signal based on the signal of the PDA is assumed to be an A image signal, and an image signal based on the signal of the PDB is assumed to be a B image signal. A signal obtained by adding the A image signal and the B image signal corresponds to an imaging signal. The B image signal is acquired by reading out the A image signal and then subtracting the A image signal from the imaging signal, or the A image signal is acquired by reading out the B image signal and then subtracting the B image signal from the imaging signal.

By a known method, a defocus amount related to focus detection of an imaging optical system can be measured through correlation calculation of the A image signal and the B image signal. Signals in all rows are not necessarily required for such correlation calculation, and arithmetic processing for thinning out the A image signal or the B image signal in a row direction or a column direction may be performed.

The present example exhibits the same effects as those in the above-described examples in a pixel configuration in which a photoelectric conversion unit or circuit includes a plurality of photoelectric conversion elements, and an imaging signal and a phase difference detection type focus detection signal, or a plurality of image signals (parallax image signals) from different viewpoints can be acquired. Note that the two-division type configuration of the photoelectric conversion circuit is an example, and the disclosure can be applied to an imaging device having a pixel configuration having a three or more-division or multiple-division photoelectric conversion circuit.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-028330, filed Feb. 25 2022, which is hereby incorporated by reference wherein in its entirety.

What is claimed is:

1. An imaging device comprising:
a pixel circuit;
a signal circuit that is electrically connected to the pixel circuit;
an AD (Analog-to-Digital) conversion circuit that converts an analog signal output by the signal circuit into a digital signal; and
a drive circuit configured to drive the pixel circuit and the signal circuit,
wherein the pixel circuit includes
a photoelectric conversion circuit that performs photoelectric conversion on light from a subject,
a charge discharge circuit that discharges signal charge of the photoelectric conversion circuit,
a first holding circuit that holds a signal based on an output of the photoelectric conversion circuit, and
a first transfer circuit that transfers a signal based on the output of the photoelectric conversion circuit to the first holding circuit, the signal circuit includes
a second holding circuit that holds a signal based on an output of the pixel circuit, and
a second transfer circuit that transfers a signal based on the output of the pixel circuit to the second holding circuit,
wherein the drive circuit is configured to drive the pixel circuit to alternately performs transfer of charge from the photoelectric conversion circuit to the first holding circuit by the first transfer circuit plurality of times and discharge of charge from the charge discharge circuit plurality of times during a period of a first frame,
the drive circuit is configured to drive the second transfer circuit to transfer a signal from the pixel circuit to the second holding circuit after the drive circuit transfers charge to the first holding circuit plurality of times, and to outputs the signal from the second holding circuit to the AD conversion circuit during a period of a second frame following the first frame.

2. The imaging device according to claim 1, wherein the first holding circuit has a charge holding capacity for the signal charge of the photoelectric conversion circuit.

3. The imaging device according to claim 1, wherein the second holding circuit has a voltage holding capacity or a charge holding capacity for the signal based on the output of the pixel circuit.

4. The imaging device according to claim 1, wherein the pixel circuit includes a charge-voltage conversion circuit, and
the second holding circuit has a voltage holding capacity for the signal based on the output of the pixel circuit.

5. The imaging device according to claim 1, wherein the second transfer circuit transfers a plurality of signals from the pixel circuit to the second holding circuit before signals are output from the signal circuit to the conversion circuit.

6. The imaging device according to claim 1, wherein the photoelectric conversion circuit includes a plurality of photoelectric conversion elements, and
the first holding circuit has a charge holding capacity for signal charge corresponding to each of the plurality of photoelectric conversion elements.

7. The imaging device according to claim 1, further comprising:
a plurality of the pixel circuits arranged in a row direction and a column direction,
wherein the conversion circuit performs conversion on the signal from the signal circuit in a row-sequential manner.

8. The imaging device according to claim 1, further comprising:
a first substrate having the pixel circuit and a second substrate having the signal circuit,
wherein the first and second substrates are laminated on each other.

9. The imaging device according to claim 1, further comprising:
a substrate having the pixel circuit and the signal circuit.

10. A control method executed in an imaging device including a pixel circuit, a signal circuit that is electrically connected to the pixel circuit, an AD (Analog-to-Digital) conversion circuit that converts an analog signal output by the signal circuit into a digital signal, and a drive circuit configured to drive the pixel circuit and the signal circuit, the control method comprising:
causing the pixel circuit to execute the following steps including
performing photoelectric conversion on light from a subject by a photoelectric conversion circuit,
discharging signal charge of the photoelectric conversion circuit by a charge discharge circuit, and
transferring a signal based on an output of the photoelectric conversion circuit to a first holding circuit by a first transfer circuit, and driving the pixel circuit so that the pixel circuit alternately performs transfer of charge from the photoelectric conversion circuit to the first holding circuit by the first transfer circuit plurality of times and discharge of charge from the charge discharge circuit plurality of times during a period of a first frame; and
causing the signal circuit to execute the following steps including
driving the second transfer circuit to transfer a signal based on the output of the pixel circuit to a second holding circuit after the drive circuit transfers charge to the first holding circuit plurality of times, by a second transfer circuit, and
outputting the signal from the second holding circuit to the AD conversion circuit during a period of a second frame following the first frame.

11. The control method according to claim 10, further comprising transferring a plurality of signals from the pixel circuit to the second holding circuit before signals are output from the signal circuit to the conversion circuit.

12. The control method according to claim 10, further comprising:
arranging a plurality of the pixel circuits in a row direction and a column direction,
performing conversion on the signal from the signal circuit in a row-sequential manner by the conversion circuit.

* * * * *